United States Patent
Utz

(10) Patent No.: US 11,848,602 B2
(45) Date of Patent: Dec. 19, 2023

(54) CIRCUIT ASSEMBLY, ELECTROLYSIS DEVICE, AND METHOD FOR OPERATING A CIRCUIT ASSEMBLY OR AN ELECTROLYSIS DEVICE

(71) Applicant: Siemens Energy Global GmbH & Co. KG, Bayern (DE)

(72) Inventor: Peter Utz, Nuremberg (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 157 days.

(21) Appl. No.: 17/442,795

(22) PCT Filed: Mar. 26, 2020

(86) PCT No.: PCT/EP2020/058546
§ 371 (c)(1),
(2) Date: Sep. 24, 2021

(87) PCT Pub. No.: WO2020/207811
PCT Pub. Date: Oct. 15, 2020

(65) Prior Publication Data
US 2022/0181965 A1    Jun. 9, 2022

(30) Foreign Application Priority Data

Apr. 10, 2019 (EP) .................................... 19168372

(51) Int. Cl.
*H02M 7/06* (2006.01)
*H02M 1/40* (2007.01)
(Continued)

(52) U.S. Cl.
CPC .............. *H02M 1/40* (2013.01); *H01F 29/14* (2013.01); *H02M 1/12* (2013.01); *H02M 7/06* (2013.01);
(Continued)

(58) Field of Classification Search
CPC ............ H02M 1/40; H02M 1/12; H02M 7/06; H02M 7/219; H01F 29/14; H01F 2029/143
See application file for complete search history.

(56) References Cited

U.S. PATENT DOCUMENTS 2,774,920 A * 12/1956 Kesselring .............. H02M 7/36
361/204
3,371,263 A * 2/1968 Ostreicher .............. G05F 1/325
323/250
(Continued)

FOREIGN PATENT DOCUMENTS

AT         512488 A1    8/2013
CN        1695214 A    11/2005
(Continued)

OTHER PUBLICATIONS

PCT International Search Report and Written Opinion of International Searching Authority dated Jul. 10, 2020 corresponding to PCT International Application No. PCT/EP2020/058546 filed Mar. 26, 2020.

*Primary Examiner* — Gary L Laxton
(74) *Attorney, Agent, or Firm* — Wolter Van Dyke Davis, PLLC

(57) ABSTRACT

A circuit assembly includes at least one coil assembly with a first coil and a second coil, the first coil being connected to a DC voltage side of a rectifier of the circuit assembly, and the second coil being connected to a power source of the circuit assembly, the first coil and the second coil being coupled to each other via a coupling component of the coil assembly, the coupling component forming a core of each of the coils.

11 Claims, 2 Drawing Sheets

(51) Int. Cl.
*H01F 29/14* (2006.01)
*H02M 1/12* (2006.01)
*H02M 7/219* (2006.01)

(52) U.S. Cl.
CPC ....... *H02M 7/219* (2013.01); *H01F 2029/143* (2013.01)

(56) References Cited

U.S. PATENT DOCUMENTS

| | | | |
|---|---|---|---|
| 6,031,737 | A | 2/2000 | Green |
| 9,118,289 | B1* | 8/2015 | Fraley ................ H03F 9/00 |
| 9,774,259 | B1 | 9/2017 | Ikriannikov |
| 2001/0006470 | A1 | 7/2001 | Musat |
| 2003/0076202 | A1* | 4/2003 | Haugs ................ G05F 1/32 |
| | | | 335/1 |
| 2005/0073863 | A1 | 4/2005 | de Rooij et al. |
| 2005/0073865 | A1 | 4/2005 | Steigerwald |
| 2005/0146226 | A1* | 7/2005 | Trainer ............... H02M 1/12 |
| | | | 307/73 |
| 2010/0067274 | A1 | 3/2010 | Breitmaier |
| 2011/0103106 | A1 | 5/2011 | Sato |
| 2014/0268933 | A1 | 9/2014 | Zhou |
| 2017/0330682 | A1 | 11/2017 | Hamberger |
| 2018/0302004 | A1* | 10/2018 | Jamali ................ H02J 3/01 |
| 2018/0350513 | A1* | 12/2018 | Murakami ........... H02M 3/01 |

FOREIGN PATENT DOCUMENTS

| | | |
|---|---|---|
| CN | 101521374 A | 9/2009 |
| CN | 101669275 A | 3/2010 |
| CN | 102106072 A | 6/2011 |
| CN | 104065259 A | 9/2014 |
| CN | 104078199 A | 10/2014 |
| CN | 107004495 A | 8/2017 |
| DE | 102014200018 A1 | 7/2015 |
| EP | 2228894 A1 | 9/2010 |
| GB | 540379 A | 10/1941 |
| JP | S5950780 A | 3/1984 |
| JP | H09238912 A | 9/1997 |
| JP | H10295080 | 11/1998 |
| JP | H11514836 A | 12/1999 |
| JP | 2002272113 | 9/2002 |
| JP | 2007006601 A | 1/2007 |
| WO | 2020207811 A1 | 10/2020 |

\* cited by examiner

CIRCUIT ASSEMBLY, ELECTROLYSIS DEVICE, AND METHOD FOR OPERATING A CIRCUIT ASSEMBLY OR AN ELECTROLYSIS DEVICE

CROSS REFERENCE TO RELATED APPLICATIONS

This application is the US National Stage of International Application No. PCT/EP2020/058546 filed 26 Mar. 2020, and claims the benefit thereof. The International Application claims the benefit of European Application No. EP19168372 filed 10 Apr. 2019. All of the applications are incorporated by reference herein in their entirety.

FIELD OF INVENTION

The invention relates to a circuit assembly comprising at least one coil assembly with a first coil and a second coil, wherein the first coil is connected to a DC voltage side of a rectifier of the circuit assembly and the second coil is connected to a current source of the circuit assembly. The invention further relates to an electrolysis device and to a method for the operation of a circuit assembly or of an electrolysis device.

BACKGROUND OF INVENTION

Chemical electrolyses such as hydrogen electrolyses are carried out using electrolyzers operated with direct current. In the case of electrolyses carried out on an industrial scale, the direct current is, for example, provided via grid-driven rectifiers. Due to the way the rectifier works, harmonics that can stress the alternating current power grid and/or the direct current power grid can arise during the rectification of a grid-side AC voltage. One way to reduce the stress can, for example, be achieved by a higher-pulse-rate installation in which a plurality of rectifiers are operated, each with a respective phase offset referenced to the grid voltage, to generate the direct current. This can, however, lead to problems on the direct current side, since the instantaneous values of the DC voltages generated by the individual rectifiers can be different, and circulating currents can thus flow between the rectifiers. It is on the one hand possible to use a direct current choke between the two rectifiers, or a plurality of direct current chokes, in order to correct this problem.

The use of one or a plurality of direct current chokes is furthermore known to avoid harmonics on the direct current side. A direct current choke of this sort can, for example, be employed in each direct current system that comprises a rectifier. The use of one direct current choke for each direct current system has the disadvantage that the coils each require a large amount of iron, since the iron circuit of the direct current chokes is completely pre-saturated by the direct current generated for operation of the electrolyzers. The amount of iron, furthermore, is necessary for each direct current choke, or for each rectifier being used.

A balance choke connected between two direct current systems can also become very large since the direct current balancing choke must accept the voltage difference between the two direct current systems because of the phase offset between the two rectifiers. Furthermore, depending on the pulse factor of the installation, a plurality of balance chokes may be necessary for different frequencies, in order also to achieve an adequate filtering of harmonics. In this case again, the balance chokes used each require a large iron core.

Due to the high current magnitudes of the direct current that are required for industrial electrolysis applications, tough requirements are placed on the balance chokes or direct current chokes used, which is in particular associated with a significant size of the iron core and thus, also, with a significant physical size, a significant weight and high costs for the chokes.

SUMMARY OF INVENTION

The invention is therefore based on the object of disclosing a circuit assembly by means of which a requirement for iron for a direct current choke can be reduced.

To achieve this object, it is provided according to the invention in a circuit assembly of the type mentioned in the beginning that the first coil and the second coil are coupled to one another by means of a coupling component of the coil assembly that forms a core of each of the coils.

The first coil, which is connected to the DC voltage side of the DC voltage rectifier of the circuit assembly, is thus used as a direct current choke for smoothing the DC voltage or as a smoothing device for smoothing the direct current or for attenuating harmonics that overlay the direct current. The second coil, coupled to the first coil by way of the coupling component as a common core, can, with appropriate current supply, act as a compensation coil, so that within the common coupling element a magnetic flux generated by the second coil counteracts the magnetic flux generated by the first coil, which carries the direct current generated through the rectifier. This has the effect of a complete or at least partial compensation of the magnetic flux generated by the first coil. As a result of this compensation, the amount of iron within the first coil can be reduced without the inductance needed in the coil for smoothing the direct current being reduced. In spite of the reduced amount of iron in the first coil, the smoothing of the direct current (or the attenuation of the harmonics) can take place in this way.

The coupling component that couples the first coil and the second coil to one another forms one core of each the coils, or a coil core of the first coil and a coil core of the second coil. The coupling component can for this purpose extend at least partially inside the windings of the first coil and the windings of the second coil. The coupling created by the coupling component between the coils is here a magnetic coupling, so that when the circuit assembly is operating, a magnetic flux generated by the second coil can counteract the magnetic flux generated by the first coil within the coupling element.

The second coil is connected to a current source of the circuit assembly to generate the magnetic flux within it. The current source here can be a direct current source which, due to the function of the second coil, can also be called the compensation current source. The use of a permanent magnet is, in principle, also possible instead of the compensation current source and the second coil. However, the use of the second coil connected to the current source advantageously enables an adjustment of a direct current feeding the second coil, so that different magnitudes of the magnetic flux generated by the second coil, or different magnitudes of the compensation, can be achieved.

It can be provided according to the invention that the coupling component is an iron core designed in particular in the form of a yoke. A magnetic coupling of the first coil and of the second coil is enabled through the design of the coupling component as an iron core. The coupling component designed as an iron core can consist of one or a plurality of pieces. A yoke-like design of the iron core here makes it possible for the first coil and the second coil each to be arranged on one leg of the coupling component. To simplify assembly of the coil assembly of the circuit assembly, it can in particular be provided that the coupling component comprises a U-shaped or essentially U-shaped element and an I-shaped or essentially I-shaped element. The elements can be assembled into a yoke-like shape in that the I-shaped element is arranged on the opening of the U-shaped element in such a way that a coupling component as a closed yoke results.

The provision of the compensation according to the invention makes it possible for the amount of iron to be significantly reduced, in particular to use less iron than would be necessary to avoid saturation without taking the compensation flux into consideration. It can therefore be provided that the amount of iron in the yoke-like iron core is chosen to be lower than, in particular less than half, what would be required for complete saturation of the coil core of the first coil by the maximum magnetic flux generated by the direct current flowing through the first coil generated by the rectifier if the magnetic flux generated by the second coil were not taken into consideration.

It can, according to the invention, be provided for the coil assembly that the second coil of the coil assembly has a higher winding count than the first coil of the coil assembly. This has the advantage that the current through the second coil to compensate the magnetic flux generated by the current flowing through the first coil can be smaller than the current through the first coil. Since very high currents can flow through the first coil, in particular in circuit assemblies that are employed for the operation of electrolyzers used on an industrial scale, it is possible through the increase in the winding count, or the number of windings, of the second coil for a direct current with a lower current magnitude to be fed into the second coil. The first coils can, for example, each be designed for direct currents with a current magnitude between 100 A and 1 kA.

It can be provided according to the invention that the circuit assembly comprises a plurality of rectifiers and a plurality of coil assemblies, wherein the first coils of the coil assemblies are each connected to a different one of the rectifiers. Each of the rectifiers of the circuit assembly can in particular here be connected to a first coil of one of the coil assemblies and it is thus advantageous for there to be a coil assembly for each rectifier. A smoothing of the generated direct currents can thus be performed by the first coils of the coil assemblies, for example when operating the rectifiers in parallel.

It can, furthermore, be provided according to the invention that the second coils of the coil assembly are connected together to the current source, in particular connected in series. This makes it possible that with a plurality of rectifiers operating in parallel, each connected to a first coil, the second coils of all the coil assemblies can be fed in common by way of the current source. In a series circuit of the second coils, the compensation current generated by the current source here flows through all the second coils, and serves there to generate the magnetic flux used for the compensation. In this way the current requirement of the circuit assembly according to the invention can advantageously be reduced. The ratio of the winding count of the first coil and winding count of the second coil can here be the same or different for the coil assemblies. In the case of rectifiers operated with equal output current magnitudes, the winding counts and/or the ratios of the winding counts can be the same for each of the coil assemblies. If the rectifiers are operated with different output current magnitudes, the winding ratios of the coil assemblies can be different, so that in each case a compensation of the magnetic flux generated by the current in the first coil can be generated with the compensation current through the second coil.

It can be provided according to the invention that the current source is controllable, and in particular that it is designed as a rectifier and/or that the rectifier or rectifiers can be controlled and/or that it is or they are designed as a three-phase rectifier, in particular as a B6 bridge rectifier. Due to the controllability of the current source, the magnetic flux generated in each case by the second coil or the second coils can also be controlled, so that the compensation function of the second coil can be matched to current operation of the rectifier or rectifiers. A current source designed as a rectifier can, for example, be fed via the same power grid as the rectifier or rectifiers of the circuit assembly. A controllability of the rectifier or rectifiers, which advantageously are designed as three-phase rectifiers or as B6 bridge rectifiers, makes it possible to adjust the total current generated by the rectifier or rectifiers, and thus, for example, to control the operation of an electrolysis device connected to the circuit assembly.

In one embodiment of the invention it can be provided that the rectifier or rectifiers is or are each connected on the AC voltage side to a secondary winding of at least one transformer of the circuit assembly. In a circuit assembly that comprises a plurality of rectifiers, there can in particular be a phase offset between the secondary windings with respect to the AC voltage fed in on the AC voltage side. The number of secondary windings operated with phase offset in relation to one period of the AC voltage fed in on the AC voltage side here determines the pulse factor of the circuit assembly. The transformers can, for example, transform a three-phase voltage fed in on the primary side or on the AC voltage side, in particular a medium voltage or high voltage of a power grid, into a three-phase AC voltage with a lower voltage present at the secondary windings. This three-phase AC voltage present at the secondary windings can then be converted by the rectifier connected to the respective secondary winding into a DC voltage, or a corresponding three-phase alternating current output by the secondary windings can be converted by the rectifier into a direct current.

For an electrolysis device according to the invention, it is provided that it comprises a circuit assembly according to the invention, wherein the first coil or the first coils of the circuit assembly are connected to at least one electrolyzer of the electrolysis device. The first coils of a plurality of coil assemblies of the circuit assembly can here, for example, be connected in parallel to achieve a high total current magnitude for operation of the at least one electrolyzer. The first coils can, for example, each be designed for direct currents with a current magnitude between 100 A and 1 kA, while the total current thus results from the sum of each of the currents flowing through the first coils.

All of the advantages and designs described above for the circuit assembly according to the invention apply correspondingly to the electrolysis device according to the invention.

It is provided for a method according to the invention for the operation of a circuit assembly according to the invention or of an electrolysis device according to the invention, that the first coil and the second coil of the at least one coil assembly are supplied with currents in such a way that the magnetic flux generated by the second coil counteracts the magnetic flux generated by the first coil, at least within the common coupling element. A complete or at least partial compensation of the magnetic flux generated by the first coil in the segment of the coupling element that acts as the coil core of the first coil can thereby be achieved. If a current with the current magnitude $I_1$ flows through the first coil, and the first coil comprises n windings and the second coil m windings, then a current magnitude of $I_2=I_1 \cdot (n/m)$ can be set for the current flowing through the second coil, wherein the current directions of $I_1$ and $I_2$ are chosen such that the magnetic flux generated by the second coil counteracts the magnetic flux generated by the first coil, at least within the common coupling element.

It can be provided according to the invention that a useful direct current generated by the rectifier or rectifiers, and a compensation direct current generated by the current source, are controlled on the basis of a common, relative setpoint current specification.

The setpoint current specification can here, for example, lie between a value of 0%, which corresponds to a switched-off state of the circuit assembly, and 100%, which corresponds to a maximum direct current output by the circuit assembly. With a constant winding ratio between the windings n of the first coil and the windings m of the second coil of the at least one coil assembly, the magnetic flux generated at any one time is directly proportional to the corresponding current magnitudes of the useful current or of the compensation current, so that a simple controllability of both the rectifier and the current source of the circuit assembly is advantageously enabled.

All of the advantages and embodiments described above in relation to the circuit assembly according to the invention and to the electrolysis device according to the invention also apply correspondingly to the method according to the invention.

BRIEF DESCRIPTION OF THE DRAWINGS

Further advantages and details of the invention emerge from the drawings. These are schematic illustrations, in which.

DETAILED DESCRIPTION OF INVENTION

Figure 1:
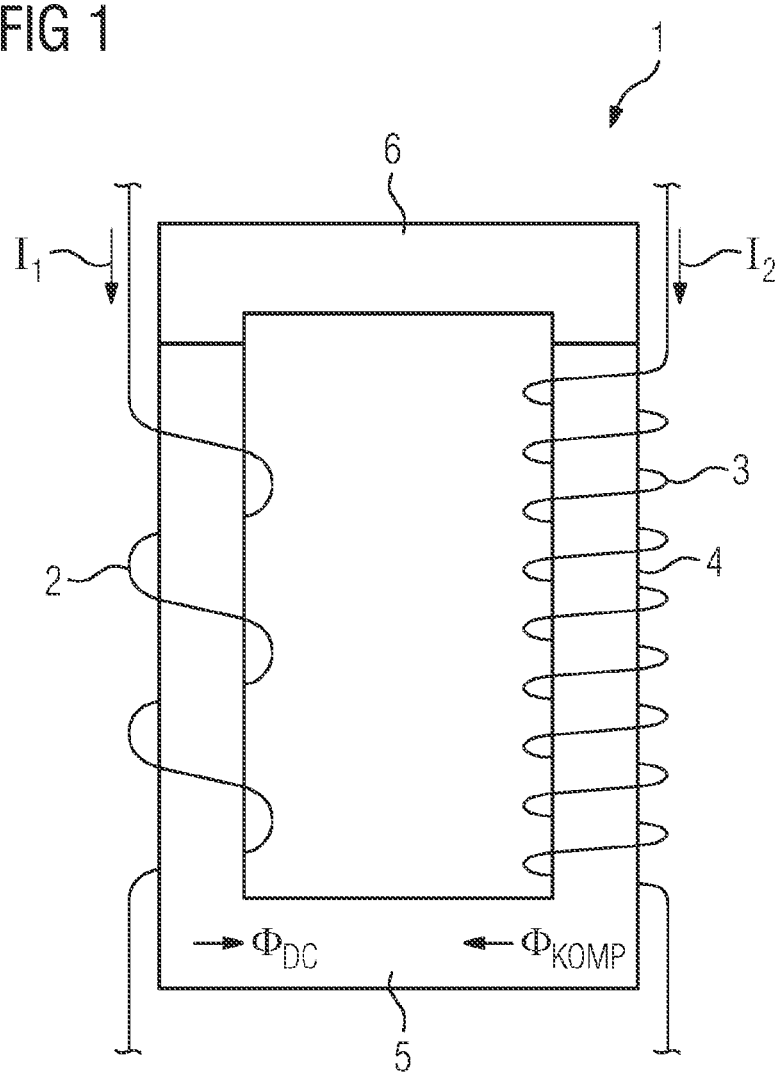
FIG. 1 shows a coil assembly of a circuit assembly according to the invention.

A coil assembly 1 of a circuit assembly according to the invention is illustrated in FIG. 1. The coil assembly 1 comprises a first coil 2 and a second coil 3. The coil assembly furthermore comprises a coupling component 4. The coupling component 4 comprises a U-shaped element 5 and an essentially I-shaped element 6 that is arranged on the U-shaped element 5 in such a way that a yoke-like total form of the coupling component 4 results. The first coil 2 is coupled to the second coil 3 via the coupling component 4. The coupling component 4 furthermore forms a core of the first coil 2 as well as of the second coil 3.

The first coil 2 comprises n windings, and the second coil 3 comprises m windings. The number of windings of the first coil 2 and of the second coil 3 illustrated are exemplary, and are to be understood purely schematically. The first coil 2 can, for example, be designed for direct currents with a current magnitude between 100 A and 1 kA, while the second coil 3 can also be designed for lower current magnitudes according to the winding ratio n/m.

Due to the coupling between the first coil 2 and the second coil 3 via the coupling component 4, a magnetic flux $\Phi_{DC}$ in the coupling component 4 generated by the current $I_1$ flowing through the first coil 2 is entirely or partially compensated for by the magnetic flux $\Phi_{KOMP}$ that is generated by the current $I_2$ flowing through the second coil 3. This compensation makes it possible to advantageously reduce the quantity of iron in the interior of the first coil 2 without significantly affecting its properties in relation to smoothing the current $I_1$.

Figure 2:
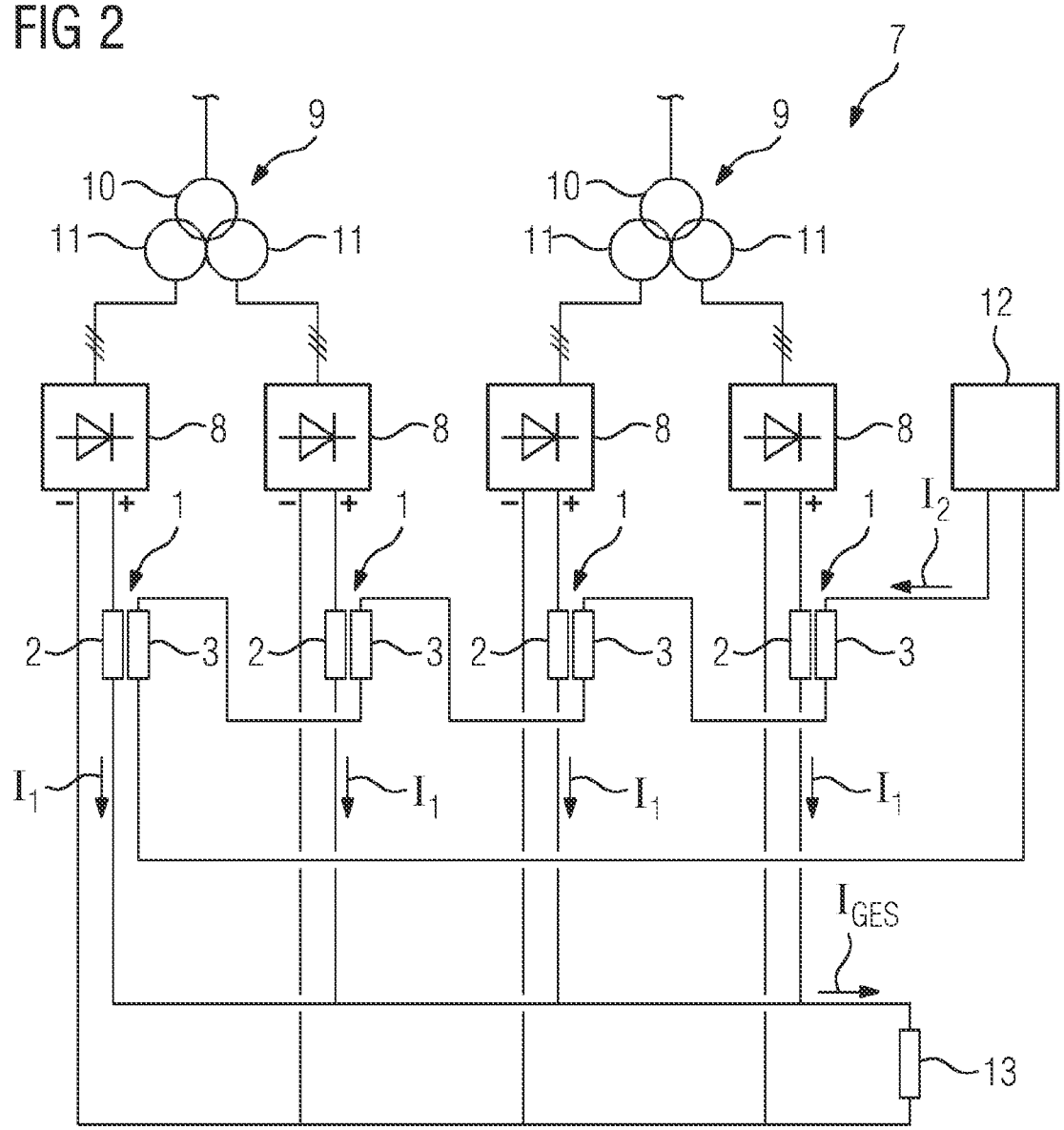
FIG. 2 shows a circuit diagram of an electrolysis device according to the invention.

A circuit assembly 7 according to the invention is illustrated in FIG. 2. The circuit assembly 7 comprises four coil assemblies 1 and four rectifiers 8. The first coils of the coil assembly 1 are here each connected to the DC voltage side of one of the rectifiers 8. The circuit assembly 7 further comprises two transformers 9, each of which comprises a primary winding 10 and two secondary windings 11. The primary windings 10 of the transformers 9 are, for example, connected here to a power grid, for example a medium-voltage grid or a high-voltage grid. The secondary windings 11 of each transformer 9 can each have a phase offset, for example of 30°, with respect to one another. The transformers 9 can, furthermore, be operated in such a way that the primary windings 10 have a phase offset of 15° with respect to one another, so that a pulse factor of 24 results for the illustrated circuit assembly 7.

The three-phase alternating current output by the secondary windings 11 is converted by the rectifiers 8 into a direct current that flows in each case as a current $I_1$ through a first coil 2 of the coil assembly 1. A smoothing of each of the currents $I_1$, or of the total direct current $I_{GES}$ resulting from the sum of the currents $I_1$, is brought about by the first coil 2 of the coil assembly 1 acting as a direct current choke. The magnetic flux generated by the first coils 2 as a result of the currents $I_1$ in the coupling component 4 can be fully or partially compensated for by the current $I_2$ flowing through the second coils 3 of the coil assemblies 1. The second coils 3 of the coil assemblies 1 are connected in series, and are connected to a current source 12 generating the current $I_2$.

The circuit assembly 7 can be a part of an electrolysis device comprising at least one electrolyzer 13, wherein the at least one electrolyzer 13 is fed by the total direct current $I_{GES}$ resulting as the sum of the currents $I_1$.

If the currents $I_1$ have the same magnitude, the same winding ratio of n to m of the windings n of the first coil and the windings m of the second coil can be used in each of the coil assemblies 1. In this way, the same compensation is achieved by the coil assembly 1 for each of the magnetic fluxes $\Phi_{DC}$ generated by the respective first coils 2 through the current $I_2$ flowing through all second coils 3. The complete or partial compensation of the magnetic flux $\Phi_{DC}$ by the magnetic flux $\Phi_{KOMP}$ that is generated in each case by the current $I_2$ flowing through the series-connected second coils 3 enables a reduction in the amount of iron in the respective first coils 2 while retaining their inductance, so that no negative effects occur in the smoothing of each of the direct currents $I_1$ generated by the rectifiers 8, or of the total current $I_{GES}$, in spite of the reduced amount of iron in the first coils 2.

When operating the circuit assembly 7, or an electrolysis device comprising the circuit assembly 7, with a method according to the invention, the arithmetic signs of the current $I_1$ and $I_2$ are selected in such a way that the first coils 2 and the second coils 3 of the coil assemblies 1 are supplied with current in such a way that the magnetic flux generated by each of the second coils 3 counteracts the magnetic flux generated by the first coils 2, at least within the respectively common coupling component 4. The useful direct current $I_{GES}$ generated by the rectifiers 8, and the compensation current $I_2$ generated by the current source 12 are, with the same winding ratios of n to m in each case, proportional to one another, so that both the compensation by the current $I_2$ as well as the current magnitude of the useful direct current, or of the total direct current $I_{GES}$, can be controlled together on the basis of a relative setpoint current specification. The setpoint current specification can here, for example, lie between a value of 0%, which corresponds to a switched-off state of the circuit assembly, and 100%, which corresponds to a maximum direct current output by the circuit assembly.

The rectifiers 8 are designed as three-phase rectifiers. The rectifiers 8 can, for example, be designed as B6 bridge rectifiers. The current source 12 can also be designed as a rectifier. The current source 12 can, for example, also be fed from the power grid that is connected to the primary windings 10 of the transformers 9. Both the rectifiers 8 and the current source 12 can have a controllable implementation.

The illustration of the circuit assembly 7 with four rectifiers 8 is purely exemplary. Another number of rectifiers 8 and/or another number of transformers 9 can also be employed.

Although the invention has been closely illustrated and described in detail through the exemplary embodiment, the invention is not restricted by the disclosed examples, and other variations can be derived from this by the expert without leaving the scope of protection of the invention.

LIST OF REFERENCE SIGNS

1 Coil assembly
2 First coil
3 Second coil
4 Coupling component
5 U-shaped element
6 I-shaped element
7 Circuit assembly
8 Rectifier
9 Transformer
10 Primary winding
11 Secondary winding
12 Current source
13 Electrolyzer

The invention claimed is:
1. An electrolysis device, comprising:
an electrolyzer,
a plurality of coil assemblies, each coil assembly comprising a first coil and a second coil,
a plurality of rectifiers,
wherein a first terminal of the first coil of each one of the plurality of coil assemblies is connected to a DC voltage side of one of the plurality of rectifiers, and a second terminal of the first coil of each one of the plurality of coil assemblies is connected to the electrolyzer,
wherein the second coil of each one of the plurality of coil assemblies are connected together in a series circuit with a current source,
wherein the first coil and the second coil of each coil assembly are coupled to one another via a coupling component that forms a core of each of the first and second coils of each coil assembly.

2. The electrolysis device as claimed in claim 1, wherein the coupling component is an iron core.

3. The electrolysis device as claimed in claim 1, wherein the second coil of each one of the coil assemblies has a higher winding count than the first coil of the coil assembly.

4. The electrolysis device as claimed in claim 1, wherein the first coil of each one of the plurality of coil assemblies is connected to a different one of the plurality of rectifiers.

5. The electrolysis device as claimed in claim 1, wherein one or both of the current source and one or more of the plurality of rectifiers is controllable.

6. The electrolysis device as claimed in claim 1, wherein one or more of the plurality of rectifiers is connected on an AC voltage side to a secondary winding of at least one transformer of the electrolysis device.

7. A method for operating the electrolysis device as claimed in claim 1, the method comprising:
the first coil and the second coil of at least one of the plurality of coil assemblies receiving currents in such a way that a magnetic flux generated by the second coil counteracts a magnetic flux generated by the first coil at least within the coupling component.

8. The method as claimed in claim 7, further comprising:
a direct current generated by at least one of the plurality of rectifiers and a compensation direct current generated by the current source controlled on the basis of a common, relative setpoint current specification.

9. The electrolysis device as claimed in claim 2, wherein the coupling component is designed in the form of a yoke.

10. The electrolysis device as claimed in claim 1, wherein the current source comprises a rectifier.

11. The electrolysis device as claimed in claim 5, wherein the rectifier is designed as one or both of a three-phase rectifier, and a B6 bridge rectifier.

* * * * *